United States Patent [19]

Conner, Jr.

[11] 3,822,658
[45] July 9, 1974

[54] PUNCH-TAPE-CONTROLLED SEWING APPARATUS

[75] Inventor: William R. Conner, Jr., Shelbyville, Tenn.

[73] Assignee: Stahl-Urban Company, Brookhaven, Mich.

[22] Filed: Apr. 27, 1973

[21] Appl. No.: 355,076

Related U.S. Application Data

[63] Continuation-in-part of Ser. No. 235,253, March 16, 1972, Pat. No. 3,771,477.

[52] U.S. Cl............................ 112/121.12, 318/696
[51] Int. Cl.......................................... D05b 21/00
[58] Field of Search..... 112/121.12, 121.15, 121.11, 112/102; 318/696, 685

[56] References Cited
UNITED STATES PATENTS

| | | | |
|---|---|---|---|
| 2,837,046 | 6/1958 | Carson et al.............. | 112/121.12 X |
| 3,112,433 | 11/1963 | Fairbanks...................... | 318/696 X |
| 3,329,109 | 7/1967 | Portnoff et al................ | 112/121.12 |
| 3,355,644 | 11/1967 | Goslin et al................... | 318/696 |
| 3,385,245 | 5/1968 | Ramsey et al. ............... | 112/121.12 |
| 3,614,580 | 10/1971 | Eto................................. | 318/696 |

Primary Examiner—James R. Boler
Attorney, Agent, or Firm—Koenig, Senniger, Powers and Leavitt

[57] ABSTRACT

Apparatus for automatically controlling movement of material for sewing by a sewing machine in response to a pattern determined by a punch tape. A positioning device whose movement is controlled along respective axes by a pair of stepping motors effects relative movement of the material to be sewed with respect to the sewing machine. Each of the stepping motors is of the type having a plurality of windings producing stepwise movement of the motor shaft when energized with alternate changes in polarity. A punch-tape reader detects uncoded perforations progressively arranged in a predetermined sequence in channels of a punch tape with two channels controlling each axis of movement. Solid state control circuitry for each stepping motor is interconnected with the tape reader. The circuit includes a first flip-flop responsive to detection of certain perforations in the two tape channels to alternately be switched between two stable states, a pair of flip-flops adapted for energizing the windings of one of the stepping motors, and a steering means including a plurality of AND gates interconnecting the first flip-flop to the pair of flip-flops. The arrangement provides automatic sewing of the material at high speed according to the predetermined pattern.

7 Claims, 7 Drawing Figures

FIG. 3
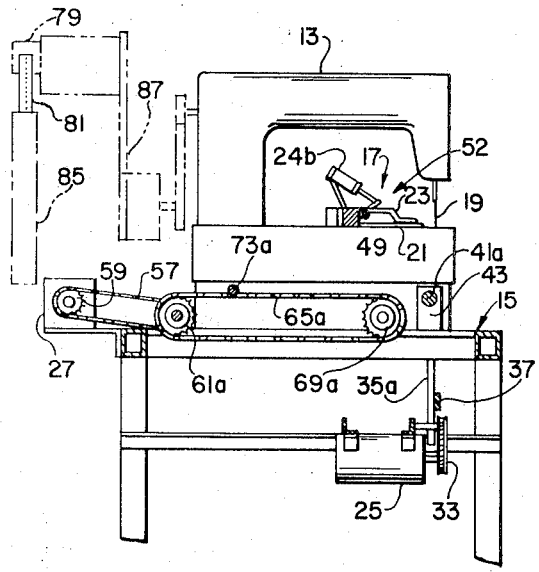
FIG. 4
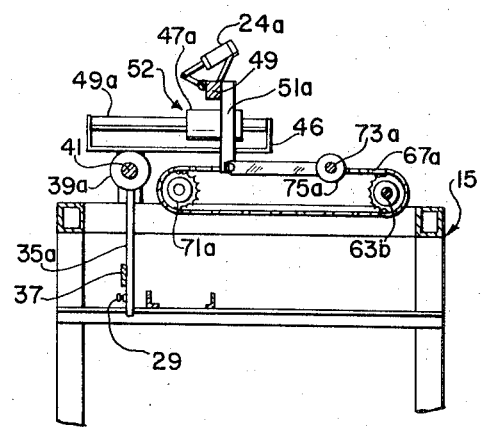
FIG. 7
| | STEPPING MOTOR COIL | | | |
|---|---|---|---|---|
| | 89a | 89b | 91a | 91b |
| STEP 1 | X | | | X |
| STEP 2 | X | | X | |
| STEP 3 | | X | X | |
| STEP 4 | | X | | X |
| STEP 5 (REVERSAL) | | X | X | |
| STEP 6 | X | | X | |
| STEP 7 | X | | | X |
FIG. 6
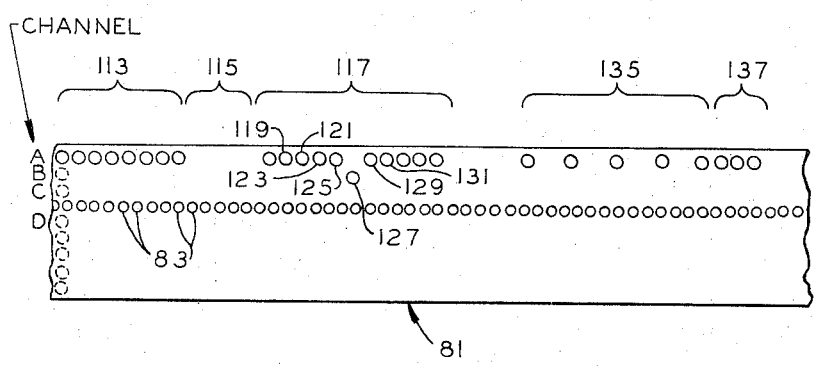

PUNCH-TAPE-CONTROLLED SEWING APPARATUS

CROSS-REFERENCE TO RELATED APPLICATION

This application is a continuation-in-part of my copending U.S. patent application Ser. No. 235,253, filed Mar. 16, 1972, now U.S. Pat. No. 3,771,477.

BACKGROUND OF THE INVENTION

This invention relates generally to positioning or guidance systems under the control of a punch tape and more particularly to a system using coded punch tape and which automatically guides material for sewing by a sewing machine according to a predetermined pattern.

It has heretofore been proposed to employ stepping motors to position a workpiece-holding table or a machine tool or the like according to certain numeric codes punched into a conventional multichannel punch tape. Such systems require the use of a special decoder or so-called processor for use with the tape reader to decode the logic of the code and convert it to electrical signals of a form useful for controlling one or more stepping motors. Systems using this technique are shown, for example, in U.S. Pat. Nos. 2,741,732, 2,937,258, 3,117,268, 3,297,929, 3,414,785 and 3,497,780.

The use of coded punch tapes may permit certain control flexibility. However, punch-tape codes as heretofore used for positioning or the like may be difficult to "read" or understand upon visual inspection of the tape, as is sometimes required. Also, the punch codes typically and inefficiently occupy numerous channels of the punch tape even though it would be desirable to use some of those channels for other control functions. In any event, the encoding and decoding of punch tapes may be quite complex (involving complex electronic decoding circuitry) where it is desired to continuously control and vary the movement of the machine tool or holding table, etc., during a cycle of operation, as distinguished from merely prepositioning the tool or table or the like.

Uncoded film tape with tracks having opaque and transparent sections have also been used in a control system for stepping motors as shown in U.S. Pat. No. 3,329,109.

Uncoded tapes, while easy to read, have also required involved and complex control circuitry which inherently has maintenance problems and is subject to the occurrence of faults which can cause loss of control and incorrect sewing operations.

SUMMARY OF THE INVENTION

Among the several objects of the invention may be noted the provision of automatic sewing apparatus; the provision of such apparatus which is punch-tape controlled and which carries out automatic, high-speed sewing of material according to a predetermined pattern defined by the punch tape; the provision of such apparatus having novel punch-tape-controlled positioning apparatus; the provision of such positioning apparatus utilizing stepping motors for positioning control; the provision of such positioning apparatus in which the punch tape includes perforations which are not in numerically coded form, requires no complicated decoding for control of the stepping motors, and yet which is easily read or understood upon visual inspection; the provision of such positioning apparatus wherein the speed and direction of the stepping motors is quickly and simply altered under continuous control of the punch tape; the provision of such positioning apparatus utilizing commercially available stepping motors of the type having windings which are energized with successive changes in polarity; the provision of apparatus of the type described in which the control circuitry is simplified and less subject to the occurrence of faults; the provision of such apparatus having control circuitry which prevents uncontrolled and incorrect sewing operations upon the occurrence of certain faults and in which trouble-shooting is facilitated; and the provision of such sewing and positioning apparatus which is easily, simply, and economically constructed. Other objects and features will be in part apparent and in part pointed out hereinafter.

Briefly, punch-tape-controlled sewing apparatus of the present invention includes a sewing machine and a positioning or feed arrangement for effecting relative movement of material with respect to the sewing machine along two possible axes of movement for sewing of the material by the sewing machine. The apparatus includes a pair of stepping motors each controlling movement by said positioning means along a corresponding one of said axes of movement. Each stepping motor has a pair of windings and a shaft interconnected with the positioning arrangement and adapted to rotate with stepwise movement when the windings of the respective motor are energized with successive alternate changes in polarity. A punch-tape reader of the system detects uncoded perforations progressively arranged in a predetermined sequence in a punch tape, rather than in a numeric code as heretofore typically employed. The perforations define a predetermined pattern of movement by the positioning means. A pair of the punch-tape channels corresponds to each of the said axes of movement. Control circuitry of the invention for energizing the windings includes a section used for effecting forward stepping of each motor and another section used for effecting a reversal in the stepping of each motor. The section used for forward stepping includes a first flip-flop connected to the tape reader, a steering means comprising a plurality of AND gates, and a pair of flip-flops interconnected with the first flip-flop and respective winding sections. The section of the control circuitry used for reversing a stepping motor includes a further flip-flop connected to the tape reader and a multiplex switching circuit. Each of the pair of flip-flops has a pair of stable states and switches alternately from one state to another in response to the first flip-flop (which also has a pair of stable states) being toggled due to the detection of perforations in one of the pair of tape channels. The alternate switching of the pair of flip-flops causes successive alternate changes in polarity of the stepping motor windings so as to cause high-speed automatic sewing of the material according to the predetermined pattern defined by the punch-tape perforations. The punch tape is preferably driven directly by the sewing machine.

BRIEF DESCRIPTION OF THE DRAWINGS

FIGS. 3 and 4 are cross-sectional views of the apparatus taken along lines 3—3 and 4—4, respectively, of FIGS. 1 and 2;

FIG. 6 is a view of a length of punch tape showing punch perforations in the tape which determine certain stepping motor operation in accordance with the invention; and FIG. 7 is a table illustrating a certain sequence in which stepping motor windings are energized by the circuitry of FIG. 5.

Corresponding reference characters indicate corresponding parts throughout the several views of the drawings.

DESCRIPTION OF THE PREFERRED EMBODIMENT

Figures 1, 2:
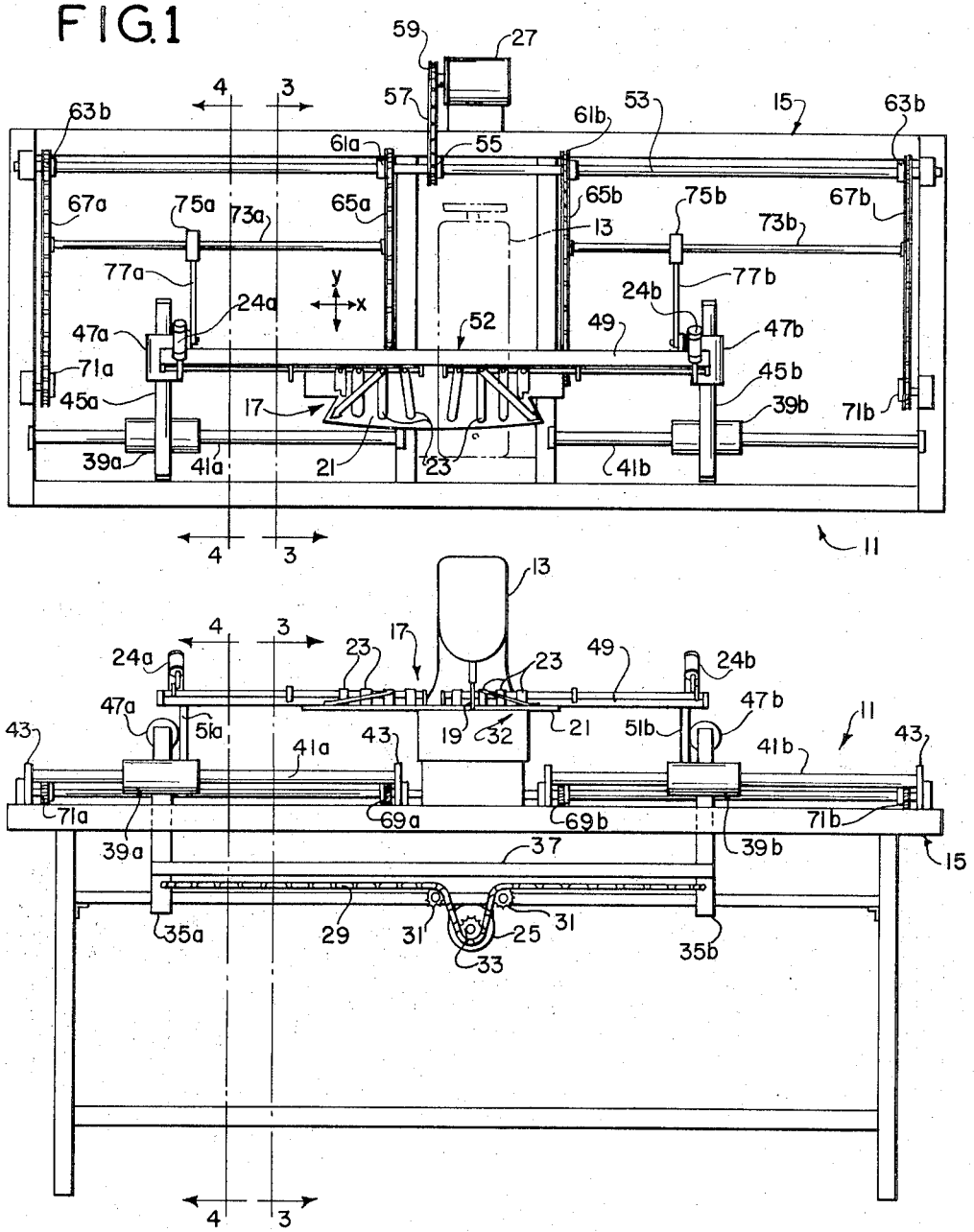
FIGS. 1 and 2 are top and side elevations, respectively, of punch-tape-controlled sewing apparatus of the invention.

Referring now to the drawings, sewing apparatus of the present invention is designated generally by the reference numeral 11 and is adapted for automatic high-speed sewing under the control of a punch tape. The apparatus includes a sewing machine 13 (shown in phantom in FIG. 1 for clarity) of a conventional electrically driven industrial type. Sewing machine 13 is suitably mounted on and supported by a frame 15. As illustrated, the apparatus is especially configured for automatically sewing a shirt collar profile, i.e., along the margin of layers of shirt collar material. Of course, it will be understood that a variety of different patterns can be sewn by the apparatus on fabric or other materials.

The apparatus comprises a positioning means including a clamp indicated generally at 17 for clamping and effecting relative movement of material to be sewn (e.g., layers of shirt collar fabric) with respect to the needle 19 of sewing machine 13. Movement of the clamp for this positioning purpose according to a predetermined pattern is determined by a punch tape. The positioning clamp 17 comprises a table 21 for supporting the layers of fabric to be sewn and several clamp elements or fingers 23. Fingers 23 are hinged in sets and are adapted to be raised for placing fabric on table 21 or to be lowered for clamping fabric against the table by a pair of small air cylinders 24a and 24b. The table 21 and fingers 23 are movable as a unit either longitudinally along an X-axis or laterally along a Y-axis with respect to frame 15 and sewing machine 13. These axes are so designated in FIG. 1.

Movement of clamp 17 along the X-axis is effected by operation of a stepping motor 25 and along the Y-axis by a stepping motor 27. A length of chain belt 29 passing over idler sprockets 31 and around a sprocket 33 carried on the shaft of stepping motor 25 is secured at opposite ends to respective arms 35a and 35b. Arms 35a and 35b, which are maintained in spaced relationship by a brace 37 between them, extend downwardly from respective so-called ball bushings 39a and 39b. Each of these ball bushings constitutes a slider bearing assembly adapted to slide freely and linearly along a respective circular rod 41a, 41b (each such rod constituting a linear bearing surface). Each of rods 41a and 41b is secured at opposite ends to frame 15 by brackets 43 for linear movement of bushings 39a and 39b along the X-axis.

Bushings 39a and 39b carry transversely oriented rods 45a and 45b by means of bracket structure 46 (FIG. 4). Ball bushings 47a and 47b (similar to bushings 39a and 39b) constitute sliders adapted to slide linearly back and forth along rods 45a and 45b respectively (these rods constituting linear bearing surfaces), and thus along the Y-axis. A bar 49 extends between bushings 47a, 47b, each end of the bar being secured by a respective arm 51a, 51b to bushings 47a and 47b, respectively. Bar 49 carries clamp 17 and is adapted to be moved back and forth along the Y-axis parallel to the X-axis through operation of stepping motor 27. Bar 49, clamp 17 and its associated subassemblies, and bushings 47a, 47b together may be regarded as a carriage designated generally 52, the entire carriage being movable along either axis.

For the purpose of moving the carriage along the Y-axis, a shaft 53 extending longitudinally along the length of frame 15 is journalled at its ends to the frame. A sprocket 55 on shaft 53 is driven via a chain belt 57 from a drive sprocket 59 on the output shaft of stepping motor 27. Shaft 53 carries four drive sprockets 61a, 61b and 63a, 63b around which pass respective chain belts 65a, 65b and 67a, 67b. The belts are tensioned by respective idlers 69a, 69b and 71a, 71b. Rods 73a and 73b are carried between pairs of these chain belts. I.e., the ends of rod 73a are connected to belts 65a and 67a, respectively, while the ends of rod 73b are connected to belts 65b and 67b, respectively. Thus rods 73a and 73b are together shifted along the Y-axis by operation of stepping motor 27. Each of rods 73a, 73b has on it a respective ball joint rod end bearing 75a, 75b adapted to slide freely along the respective rod. Respective links 77a, 77b interconnect the bearings 75a, 75b with arms 51a, 51b.

Accordingly, when shifted along the X-axis, carriage 52 is maintained in parallel relationship with the X-axis since bearings 75a, 75b slide freely along the respective bars 73a, 73b upon shifting of the carriage. However, upon rotation of the output shaft of motor 27, chains 65a, 65b and 67a, 67b shift rods 73a, 73b in a direction corresponding to the rotation direction of the output shaft of motor 27. Thus carriage 52 is shifted along the Y-axis through operation of motor 27.

Means is employed for detecting perforations in the channels of a punch tape in order to define a predetermined pattern of movement for fabric clamp 17. For this purpose, there is illustrated in outline in FIG. 3 at 79 a conventional photoelectric punch tape reader of a type suitable for reading an eight-channel punch tape 81. A length of punch tape 81 is shown in FIG. 6, apertures being shown in only two of the eight channels. Tape reader 79 includes the usual drive sprocket or the like for engaging smaller apertures 83 of the punch tape to drive it through the tape reader for deflecting of the punched apertures by photocell elements. The punch tape may be in the form of an endless loop (the sewing pattern defined by the punch pattern being thereby readily repeated) protected by a so-called tumble box 85. The tape reader drive means is connected for being operated by the drive shaft of sewing machine 13 so as to cause the punch tape to pass through reader 79 at a speed which varies as a predetermined function of the sewing machine's speed. For this purpose, reader 79 is interconnected with the sewing machine by suitable speed reduction belts or chains 87, etc., such that the punch tape is advanced preferably five steps for each stitch taken by sewing machine 13.

Each of stepping motors 25, 27 is of the commercially available type having a plurality of windings (such as two windings), the rotor shaft of the motor being adapted to rotate with stepwise movements when the windings are energized with successive sequential changes in polarity. I.e., and as will be understood by those skilled in the art, a stepwise movement of the motor's shaft occurs when the polarity of a first one of the windings is reversed while maintaining the same polarization of the second winding. Then another stepwise movement in the same direction occurs by reversing the polarity of the second winding while maintaining the same polarization of the first winding, and so on. To reverse the direction of shaft rotation, the windings are energized with a reversed sequence of successive alternate changes in polarity. I.e., one of the windings has its polarity reversed twice in succession without an intervening reversal of the polarity of the other winding.

Figure 5:
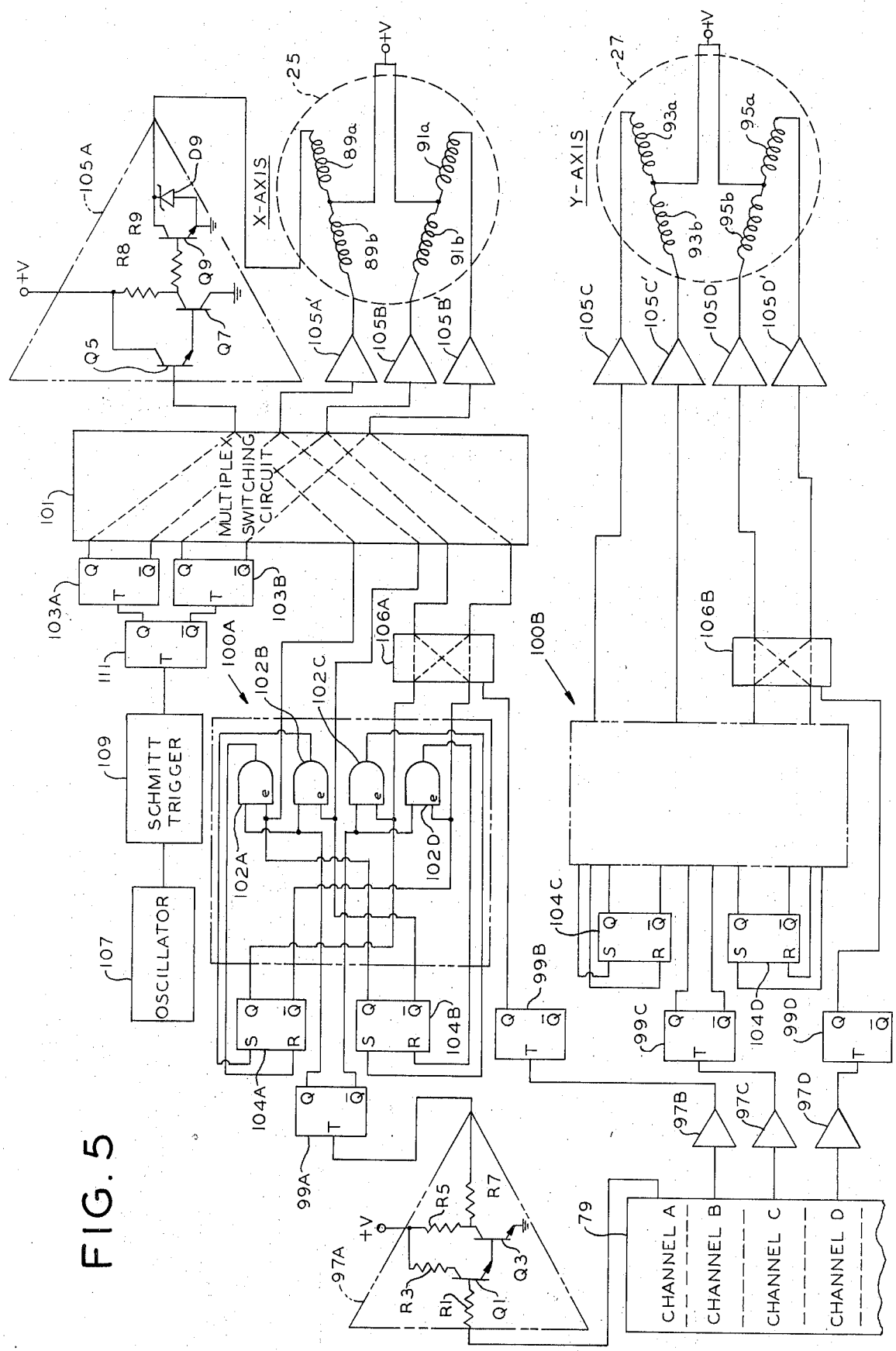
FIG. 5 is a schematic circuit diagram of certain stepping motor control circuitry of the invention.

Preferably, stepping motors 25 and 27 are each of a so-called bifilar type having two windings each of two halves. That is, each winding has two sections or coils wound in opposite directions. Referring to FIG. 5, stepping motor 25 (whose shaft controls movement along the X-axis as represented in FIG. 1) has a first winding with two coils or sections 89a, 89b and a second winding with sections 91a, 91b. Similarly, a first winding of motor 27 (controlling movement along the Y-axis) includes sections 93a, 93b and the other winding includes sections 95a, 95b. Each half or section of a winding is adapted, when energized, to polarize the respective winding in one direction. The halves of each winding are alternately energized for alternately polarizing the winding. Each of the stepping motors preferably provides 200 steps per rotation of its rotor shaft, the drive ratio being such that clamp 17 moves one inch for each fifty steps of one of the stepping motor shafts.

Circuitry for controlling energization of the windings of motors 25 and 27 is schematically diagrammed in FIG. 5. Four channels A-D of tape reader 79, each including a photocell or the like, detect punch perforations in four of the eight channels of punch tape 81. The remaining four channels of the punch tape may advantageously be used for controlling various other operational aspects of the present sewing system (such as control along a third axis) or starting and stopping of sewing machine 13 and so forth.

There are a pair of channels of the punch tape corresponding to each of the two axes of movement of clamp 17. That is, channels A and B of tape reader 79 detect uncoded perforations progressively arranged in a predetermined sequence in the first two channels of punch tape 81 for controlling movement along the X-axis. Channels C and D of the tape reader detect similarly uncoded perforations progressively arranged in a predetermined sequence in the second two channels of the punch tape to control movement along the Y-axis. This progressive perforation arrangement is explained later as to its effect or operation.

Each of channels A-D of tape reader 79 is adapted to supply a signal when its photocell (or other photoelectric element) detects an aperture in the corresponding channel of the punch tape. The signals are supplied to respective switching-type amplifiers 97A-97D. Each of amplifiers 97B-97D is identical with amplifier 97A shown in detail. Signals from tape reader channel A are supplied through a resistor R1 to the base of an NPN transistor Q1 which is Darlington-coupled to a further NPN transistor Q3. A supply voltage +V is supplied to the collectors of these two transistors through respective resistors R3 and R5.

The amplified output signal is supplied through a resistor R7 to the toggle (or clock) input of a flip-flop 99A. Amplifiers 97B-97D similarly supply amplified signals to respective flip-flops 99B-99D. The conventional power supply connections for these flip-flops, and for certain other portions of the circuitry, are not shown in order to simplify the drawings.

As is known to those in the electronics art, a flip-flop constitutes a bistable device having a pair of stable states. Such a device is adapted to be switched alternately from one state to the other. Each of flip-flops 99A-99D is known as a toggle type flip-flop. I.e., when toggled, the flip-flop switches from a state in which one of its outputs (Q or $\bar{Q}$) is "high" and the other "low" to a state in which the former is low and the latter is high. Another type of flip-flop (discussed below) is known as an S-R flip-flop. This type of flip-flop has S and R inputs and Q and $\bar{Q}$ outputs. When a signal is present at the R input, the $\bar{Q}$ output is high and the Q output is low. When a signal is applied to the S input, the flip-flop changes its state so that the Q output is low and the Q output is high; however, if two signals in succession are applied to the R input without an intervening signal being applied to the S input, the flip-flop will not change state in response to the second signal applied at the R input. I.e., $\bar{Q}$ will remain high and Q will remain low.

Further circuitry for controlling energization of the windings of each stepping motor may logically be divided into control means for effecting forward stepping of a motor and reversing means for effecting a reverse or rearward stepping of a motor.

The control means, or section of the circuitry, for effecting forward stepping of the X-axis motor 25 includes the flip-flop 99A which is toggled whenever a perforation is detected in one (channel A) of the pair of tape channels controlling movement in the X-axis. Interconnected with the outputs of flip-flop 99A is a steering means 100A comprising a plurality of AND gates 102A-102D each of which has a pair of inputs and a single output. The Q output of flip-flop 99A is commonly connected to an input of 102A and an input of 102B, while the $\bar{Q}$ output of 99A is commonly connected to respective inputs of gates 102C and 102D. The remaining inputs of 102A-102D, i.e., those not connected to the outputs of 99A, will be referred to as "enable" inputs and are indicated by e.

Interconnected with the steering means are a pair of S-R type flip-flops 104A and 104B. The respective outputs of AND gates 102A and 102B are connected to the R and S inputs of 104A, while the respective outputs of AND gates 102C and 102D are connected to the S and R inputs of 104B. The respective Q and $\bar{Q}$ outputs of flip-flops 104A and 104B are connected to the "enable" inputs of AND gates 102C, 102D, 102A and 102B, respectively. Therefore the steering means is adapted to sense and be responsive to the state of energization of the respective output terminals of flip-flops 104A and 104B.

The respective Q and $\bar{Q}$ outputs of flip-flops 104A and 104B are also connected to a plurality of switching type amplifiers (105B, 105B', 105A and 105A' respectively) to control switching of energization of respective winding sections (91*b*, 91*a*, 89*a* and 89*b*) of the X-axis stepping motor 25.

Steering means 100A prevents an unprogrammed and thus erroneous reversal of stepping motor 25 upon the occurrence of a malfunction in one of the pair of S-R flip-flops (104A, 104B). When winding sections 89*a* and 91*b* are energized then only AND gates 102A and 102C have their "enable" inputs e energized. Upon flip-flop 99A being toggled to change state, its Q output goes high and its $\overline{Q}$ output goes low. AND gate 102A will then provide a high output to the R input of flip-flop 104A causing it to switch states thereby energizing winding section 91*a* and enabling AND gate 102D while deenergizing winding section 91*b* and disabling AND gate 102C.

When flip-flop 99A is next toggled, its Q output will be switched low and its $\overline{Q}$ output high. The output of AND gate 102D will provide a high output to the R input of flip-flop 104B. If at this juncture flip-flop 104B, due to a malfunction, fails to switch its state, winding section 89*a* remains energized and AND gate 102A enabled while winding section 89*b* remains deenergized and AND gate 102B disabled. Upon flip-flop 99A being again toggled, its Q output will be switched high and its $\overline{Q}$ output low. The output of AND gate 102A will provide a high output to the R input of flip-flop 104A. Flip-flop 104A, however, will not change its state because the last input it received was also to its R input. The output of flip-flop 99A has been steered or diverted to prevent a second switching of energization at the output terminals of flip-flop 104A without intervening switching of energization at the output terminals of flip-flop 104B. Since the output terminals of 104A and 104B are connected to respective motor winding sections, the stepping motor is prevented from an unprogrammed reversal, even though it otherwise would have reversed due to the malfunction. As will be apparent to one skilled in the art, if the malfunction preventing flip-flop 104B from switching is only temporary, this section of the circuit will resume operation when flip-flop 99A is next toggled allowing continued proper stepping of the motor.

It should be noted at this point that the windings of the stepping motor remain energized except during stepping. This prevents undesired and uncontrolled movement of the workpiece because of the inherent and unavoidable vibration and movement in the sewing apparatus.

The reversal means or section of the circuit effecting a reverse stepping of the X-axis motor includes the further flip-flop 99B which is toggled whenever a perforation is detected in the other (channel B) of the pair of tape channels controlling movement of the stepping motor in the X-axis, and a switching or multiplex circuit 106A. Switching circuit 106A interconnects the outputs of flip-flops 104A with motor winding sections 91*a* and 91*b* and is connected to the Q output of flip-flop 99B.

Switching circuit 106A is preferably a multiplexer of the integrated circuit type and effects internal switching each time flip-flop 99B is toggled so that the connection of a respective input to a respective output is reversed. This section of the circuit, therefore, effects reversal of the polarity of one of the windings twice in succession without an intervening reversal of the polarity of the other winding thereby reversing the rotation of motor 25 in response to the detection of a perforation in tape channel B. Identical circuitry comprising flip-flops (99C, 99D, 104C and 104D), a steering means 100B, and a multiplexer 106B is provided for control of the Y-axis stepping motor 27.

Interconnected with the outputs of flip-flops 104A (through multiplexer 106A) and 104B is a further multiplexer 101. The latter also preferably is of an integrated circuit variety and is adapted to provide internal selective connection of either a first set of inputs (e.g., those with which flip-flops 104A, 104B are interconnected) or a second set of inputs (with which further flip-flops 103A, 103B are interconnected) to respective outputs in response to a suitable control voltage supplied by appropriate leads, etc. (not shown), to the multiplexer.

Thus in one switching mode multiplexer 101 is adapted to interconnect the outputs of flip-flops 104A, 104B with respective amplifiers 105A, 105A', 105B and 105B' whose outputs are interconnected with winding sections 89*a*, 89*b*, 91*b* and 91*a*, respectively, of stepping motor 25 (as indicated by dashed lines). Amplifiers 105C, 105C', 105D and 105D' interconnect the outputs of flip-flops 104D and 104C with sections 93*a*, 93*b*, 95*b* and 95*a*, respecitvely, of stepping motor 27.

Amplifiers 105A, 105A', etc., are identical and of a switching type. Only amplifier 105A is shown in detail and includes an NPN transistor Q5 to the base of which is supplied (by multiplexer 101) the output signal from the Q output of flip-flop 104B. Transistor Q5 is Darlington-connected to a further NPN transistor Q7 whose collector is supplied with a supply voltage +V through a load resistor R8 and is interconnected through a current-limiting resistor R9 with the base of an NPN power switching transistor Q9. A zener diode D9 is connected across the collector and emitter terminals of transistor Q9. The emitter of transistor Q9 is grounded and its collector is interconnected with one end of motor winding section 89a.

The interconnections of the winding sections or coils of motors 25 and 27 are each provided with the supply potential +V. Thus each such section (e.g., 89*a*) is energized when the power switching transistor (e.g., Q9) of the associated amplifier 105A, 105A', etc., is driven into saturation.

Flip-flops 103A and 103B constitute a portion of slew circuitry for causing slewing movement of clamp 17 along the X-axis (as for prepositioning, etc.) through operation of stepping motor 25 without regard to the operation of tape reader 79 (and thus independently of the punch tape). This slew means includes an oscillator 107 (which may operate at a frequency of several hundred hertz) and a Schmitt trigger circuit 109 (preferably of an integrated circuit type) adapted for being triggered by the output signal from oscillator 107. Thus Schmitt trigger 107 supplies an output signal of a periodic waveform in synchronism with oscillator 107. This periodic output signal is supplied to a flip-flop 111 for toggling the latter, whose Q and $\overline{Q}$ outputs are interconnected with the clock (toggle) inputs of flip-flops 103A and 103B. Thus, with each cycle of the output signal from oscillator 107, flip-flop 111 changes its state thereby to cause alternate toggling of flip-flops 103A and 103B.

In one of its switching modes (as determined by the presence of a proper control voltage), switching circuit 101 interconnects the Q and $\overline{Q}$ outputs of flip-flops 103A and 103B with the inputs of amplifier 105A, 105A', 105B and 105B', respectively, as illustrated by dashed lines. In this mode, circuit 101 does not interconnect the latter amplifiers with flip-flops 103A and 103B, of course.

It should be noted that slew circuitry similar to that described above may be provided for slewing movement of clamp 17 along the Y-axis.

In operation, the circuitry of FIG. 5 is provided with suitable power supply potentials. Start and stop control of sewing machine 13 may be assumed to be manually controlled, although it will be apparent that one of the channels of punch tape 81 not having to do with operation of the FIG. 5 circuitry per se may have apertures which have to do with this function. In any case, operation of sewing machine 13 causes movement of punch tape 81 through tape reader 79 at a speed proportional to that of the sewing machine.

Referring to FIG. 6, the channels of punch tape 81 corresponding with channels A-D of tape reader 79 are designated as such. Since operation of stepping motors 25 and 27 under control of punch tape 81 is carried out in the same way, only apertures in channels A and B, controlling the X-axis stepping motor 25, have been shown. It will be understood that the provision of apertures in tape channels C and D controls operation of the Y-axis stepping motor 27.

Tape 81 may be assumed to pass through tape reader 79 from left to right such that apertures in the channels pass by the respective photocells (or other aperture detector means of the reader) one at a time, each photocell causing a signal to be delivered to a respective one of amplifiers 97A–97D as an aperture is detected in the corresponding one of tape channels A-D.

The perforations are progressively arranged in the first and second channels, i.e., A and B, of tape 81. Perforations in channel A indicate a forward stepping of the motor. A perforation in channel B indicates a reverse stepping of the motor. A second perforation in channel B would indicate the motor is stepping forward once again. A first group of apertures designated 113 are closely spaced. There are eight apertures of group 113 defining eight rotational stepping movements of the output shaft of motor 25 to produce shifting of clamp 17 along the X-axis during sewing by sewing machine 13 of material clamped between clamp fingers 23 and clamp table 21.

Aperture group 113 is followed by an aperture-free interval 115 of the tape during which stepping motor 25 is not operated, thus producing no movement of clamp 17 along the X-axis during continued operation of sewing machine 13. The aperture-free interval 115 is followed by a further group of apertures 117 during which operation of stepping motor 25 is resumed as the sewing machine continues to operate.

In accordance with this invention, the stepping speed of the stepping motors is varied as a function of the interval between successively detected perforations or apertures of the punch tape, assuming a particular speed for sewing machine B. Stated differently, the interval between successively detected perforations determines the extent of movement (if any) for clamp 17 along the X- or Y-axis with respect to each stitch taken by the sewing machine.

As an aperture, i.e., perforation, is detected by reader 79 in a channel of the tape, a signal is transmitted to the respective switching amplifier 97A–97D. Considering, for example, the tape aperture indicated in FIG. 6 at 119, channel A of reader 79 supplies a signal to amplifier 97A causing the output of amplifier 97A to go high thereby causing toggling of flip-flop 99A. If it is assumed that the $\bar{Q}$ terminal of flip-flop 99A had previously been low and the Q terminal high, such toggling changes the state of the flip-flop, now causing the Q output to become low and the $\bar{Q}$ output to become high.

Two further assumptions are required. First, the winding sections 89b and 91b were energized prior to detection of perforation 119. Second, that switching circuit 101 interconnects the outputs of flip-flops 104B and 104A with respective switching amplifiers 105A, 105A' and 105B, 105B'. Then, as described above, detection of perforation 119 in channel A of the punch tape causes flip-flop 104B to change state thereby to provide a signal to the input of amplifier 105A and thus energize coil 89a of stepping motor 25. However, as will be apparent, amplifier 105A' does not energize coil 89b. Thus also, coil 91b of the stepping motor is energized but coil 91a is not. Accordingly, stepping motor 25 is advanced one step in the clockwise direction. This condition resulting upon detection of aperture 119 is depicted in tabular form in FIG. 7, wherein the first step is indicated by the legend "STEP 1." The energization of coils 89a and 91b is depicted by a respective X in the appropriate column.

The next step is produced by detection of an aperture 121 in channel A of the punch tape by reader 79. The resultant output signal from amplifier 97A causes toggling of flip-flop 99A, thus causing the flip-flop 104A to change state thereby reversing the polarity of the second winding of stepping motor 25 by deenergizing coil 91b and energizing coil 91a. This produces a second clockwise stepping movement of the output shaft of motor 25, as shown in FIG. 7.

As subsequent perforations in channel A are detected, the windings of stepping motor 25 are energized with successive sequential changes in polarity. Thus apertures 123 and 125 produce third and fourth clockwise steps of the stepping motor's shaft, as depicted in FIG. 7.

The next perforation as indicated at 127 in tape channel B shows that a reversal of the stepping motor should occur. This reversal step is produced by detection of perforation 127 in channel B of the punch tape by reader 79. The resultant output signal from amplifier 97B causes toggling of flip-flop 99B thereby signalling multiplexer 106A to perform its switching function. Thus, as has previously been described, the latter will switch energization of motor winding sections 91a and 91b so that winding section 91a becomes energized while winding section 91b becomes deenergized. Reference to FIG. 7 shows that the polarity of one winding has been reversed twice in succession without an intervening reversal in polarity of the other winding. Therefore, to reverse the motor direction it is necessary only to provide a perforation in tape channel B.

If the series of perforations in channel A is now continued, the motor shaft continues stepping movements in the reversed direction, i.e., counterclockwise. Thus, sixth and seventh steps (shown in FIG. 7) are produced by apertures such as indicated at 129 and 131, respectively.

Apertures which are spaced out, such as those indicated at 135, produce fewer steps per unit length of the punch tape. That is, the stepping motor shaft speed varies as a function of the interval between detected perforations of the punch tape. Hence, there is less movement of clamp 17 in response to perforations of interval 135 than for interval 117. Another group of perforations or apertures 137 provides increased speed of clamp movement, all as will be apparent. It will be understood, of course, that apertures are similarly provided in tape channels C and D for control of the Y-axis stepping motor 27.

Thus it is seen that the movement of clamp 17 as to both extent and direction and along either axis of control is precisely controlled by the punch tape 81. In this way, the punch tape defines a pattern of movement for clamp 17 for sewing of the material clamped thereby by sewing machine 13. Preferably, as noted, the punch tape is endless, facilitating repetition of the sewing pattern.

In sewing of shirt collar profiles, the fabric is placed under clamp fingers 23 on clamp table 21 and the clamp cylinders 24c and 24b are suitably actuated to firmly clamp the material. For such sewing, it is preferred that the clamp 17 be slewed from one side position along the X-axis by operation of the slew circuitry to a starting position at one end of the collar pattern from which sewing begins, is continued around the pattern, and is then terminated at the other end of the pattern. The clamp is then slewed to an opposite side position and the sewn fabric is removed. The operation is then carried out for sewing another pattern with the clamp moving in the opposite direction along the X-axis.

During such slewing steps of the operation, movement of stepping motor 25 is under the control of the slew circuitry. Referring once again to FIG. 5, oscillator 107 of this slew circuitry provides an output signal of periodic waveform which is effectively squared up and suitably shaped by Schmitt trigger 109 for toggling of flip-flop 111. The latter alternately toggles flip-flops 103A and 103B, just as the staggered perforations of the punch tape cause alternate toggling of flip-flops 99A and 99B. Through operation of switching circuit 101, toggling of flip-flops 103A, 103B causes alternate polarization of the windings of stepping motor 25 by amplifiers 105A, 105A', et cetera.

Certain significant advantages of the invention may be noted. Since the punch tape perforations are not coded, but instead directly control fabric positioning, there is no need for complicated, expensive decoding equipment as heretofore used for punch-tape-controlled positioning. Moreover, the absence of perforation codes simplifies visual comprehension. Since each perforation defines a stepping movement, direction reversals being indicated by a perforation in a certain channel, and since the spacing between perforations determines precisely the extent of clamp movement for each stitch taken by the sewing machine, accurate determination of pattern variations and adjustments in machine operation or the like are readily facilitated from visual inspection of the tape.

Further advantages of the invention are to be found in the unique design of the solid-state motor control circuitry. A steering means is employed to prevent unprogrammed reversals which could be caused by the malfunctioning of certain flip-flops in the circuitry. The steering means allow continued operation of the stepping motor if the flip-flop malfunction is transitory. Furthermore, the section of the motor control circuit effecting forward stepping is separated from the section effecting reversal of the stepping motor. If a programmed reversal fails to occur, it will be simple to identify the component which needs to be replaced. Therefore maintenance of the system will be facilitated.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Punch-tape controlled sewing apparatus comprising:
   a sewing machine;
   positioning means for effective relative movement of material with respect to said sewing machine along at least two possible axes of movement for sewing of said material by said sewing machine;
   first and second stepping motors each having a plurality of windings and a shaft interconnected with said positioning means and adapted to rotate with stepwise movements when the windings are energized with successive sequential changes in polarity, each shaft controlling movement of said positioning means along a corresponding one of said axes of movement;
   a punch-tape reader for detecting uncoded perforations progressively arranged in a predetermined sequence in a plurality of channels of a punch tape, said perforations defining a predetermined pattern of movement by said positioning means, there being a pair of said channels corresponding to each of said axes of movement; and
   control means for each of said stepping motors interconnected with said tape reader, each said control means comprising a first flip-flop responsive to detection of certain of said perforations in said pair of tape channels to alternately be switched between two stable states and a pair of flip-flops adapted for energizing the windings of a respective one of said stepping motors, each of said pair of flip-flops having two stable states for maintaining a respective winding of each respective motor energized, said pair of flip-flops being connected with the first flip-flop through a steering means, each of said pair of flip-flops having a pair of output terminals each delivering a signal which is a function of the state of the respective flip-flop, said pair of flip-flops being adapted to alternately change the polarity with which the windings of the respective motor are energized by a switching of energization at a respective pair of output terminals thereof, said steering means comprising a plurality of AND gates interconnected between said first flip-flop and said pair of flip-flops and adapted to sense the state of energization of the respective output terminals of said pair of flip-flops and further adapted to prevent a second switching of energization at said output terminals of one of said pair of flip-flops due to the response of said first flip-flop to certain perforations in said respective pair of tape channels without an intervening switching of energization at the output terminals of the other one of said pair of flip-flops, said pair of flip-flops alternately changing the polarity of said windings in response to switching of the first flip-flop whereby successive stepwise positioning movements of each motor shaft are controlled by said punch tape reader and the shafts of each motor are held stationary except during stepping and whereby said material is automatically and accurately sewed at high speed by the sewing machine according to said predetermined pattern.

2. Sewing apparatus as set forth in claim 1 wherein each of said stepping motors includes two windings each winding having two sections for opposite polarization of the respective winding;
wherein each of said plurality of AND gates has a pair of inputs and a single output;
wherein each of said pair of flip-flops has a pair of inputs;
wherein the said first flip-flop has a pair of outputs each delivering a signal which is a function of the state of said first flip-flop;
wherein one output of said first flip-flop is connected to one respective pair of inputs of one pair of said AND gates, said one pair of AND gates having their respective outputs connected to the inputs of one of said pair of flip-flops and having their other respective inputs connected to both the outputs of the other of said pair of flip-flops and respective winding sections of one of said windings; and
wherein the other output of said first flip-flop is connected to one respective pair of inputs of the other pair of said AND gates, said other pair of AND gates having their respective outputs connected to the inputs of the other of said pair of flip-flops and having their other respective inputs connected to both the outputs of said one of said pair of flip-flops and respective winding sections of the other one of said windings.

3. Sewing apparatus as set forth in claim 2 further comprising reversing means for causing reversal of each of said stepping motors, each reversing means including an additional flip-flop responsive to detection of certain other perforations in said respective pair of tape channels to alternately be switched between two stable states and a multiplex switching circuit responsive to said additional flip-flop interconnected with one of said pair of flip-flops and a respective winding of a respective motor, said multiplex switching circuit adapted to energize one winding of said stepping motor twice in sequence without intervening energization of the other of said windings by the other one of said pair of flip-flops.

4. Sewing apparatus as set forth in claim 3 wherein said control means further includes a plurality of switching amplifiers interconnected between a respective one of said output terminals of said pair of flip-flops and a respective stepping motor winding section.

5. Sewing apparatus as set forth in claim 4 further comprising slew means for causing slewing operation of a least one of said stepping motors for producing slewing movement of the positioning means independently of operation of said tape reader, said slew means including an oscillator and a further flip-flop adapted for switching alternately between each of two stable states in response to operation of said oscillator, and an additional pair of flip-flops adapted for interconnection with the windings of a stepping motor, said further flip-flop being toggled in response to an output signal from said oscillator, said further flip-flop alternately toggling said additional pair of flip-flops.

6. Sewing apparatus as set forth in claim 5, said slew means further comprising a Schmitt trigger interconnected between said oscillator and said further flip-flop, and multiplex switching means for selectively interconnecting said additional pair of flip-flops with the stepping motor windings.

7. Sewing apparatus as set forth in claim 6 further comprising means interconnected with said sewing machine for causing a punch tape to pass through said punch tape reader at a speed which varies as a predetermined function of the speed of the sewing machine, and wherein said positioning means comprises a clamp for clamping said material for sewing by said sewing machine, first drive means interconnected with the shaft of the first stepping motor for effecting transverse movement of the clamp, and second drive means interconnected with the shaft of the second stepping motor for effecting longitudinal movement of the clamp, and wherein said clamp comprises a table for supporting the material to be sewn and clamp elements for clamping the material against said table, and wherein said first and second drive means each comprise a linear bearing surface, slider means, a belt interconnected with said slider means and driven by the respective shaft of said first and second stepping motors for effecting linear sliding movement of said slider means along said linear bearing surface in response to rotation of the respective stepping motor shaft.

* * * * *